July 6, 1954 C. K. MITCHELL 2,683,190

PERFORATION OF CABLE CODE TAPE FROM WHEATSTONE SIGNALS

Filed Aug. 6, 1951 3 Sheets-Sheet 1

INVENTOR.
C. K. MITCHELL
BY R. P. Morris
ATTORNEYS

July 6, 1954 C. K. MITCHELL 2,683,190

PERFORATION OF CABLE CODE TAPE FROM WHEATSTONE SIGNALS

Filed Aug. 6, 1951 3 Sheets-Sheet 2

INVENTOR.
C. K. MITCHELL

BY R. H. Morris

ATTORNEY

PERFORATION OF CABLE CODE TAPE FROM WHEATSTONE SIGNALS

Filed Aug. 6, 1951 3 Sheets-Sheet 3

INVENTOR.
C. K. MITCHELL
BY R. P. Morris
ATTORNEY

Patented July 6, 1954

2,683,190

UNITED STATES PATENT OFFICE 2,683,190

PERFORATION OF CABLE CODE TAPE FROM WHEATSTONE SIGNALS

Charles Kirkland Mitchell, New York, N. Y., assignor to American Cable and Radio Corporation, New York, N. Y., a corporation of Delaware Application August 6, 1951, Serial No. 240,576

8 Claims. (Cl. 178—92)

Figures 1, 4:
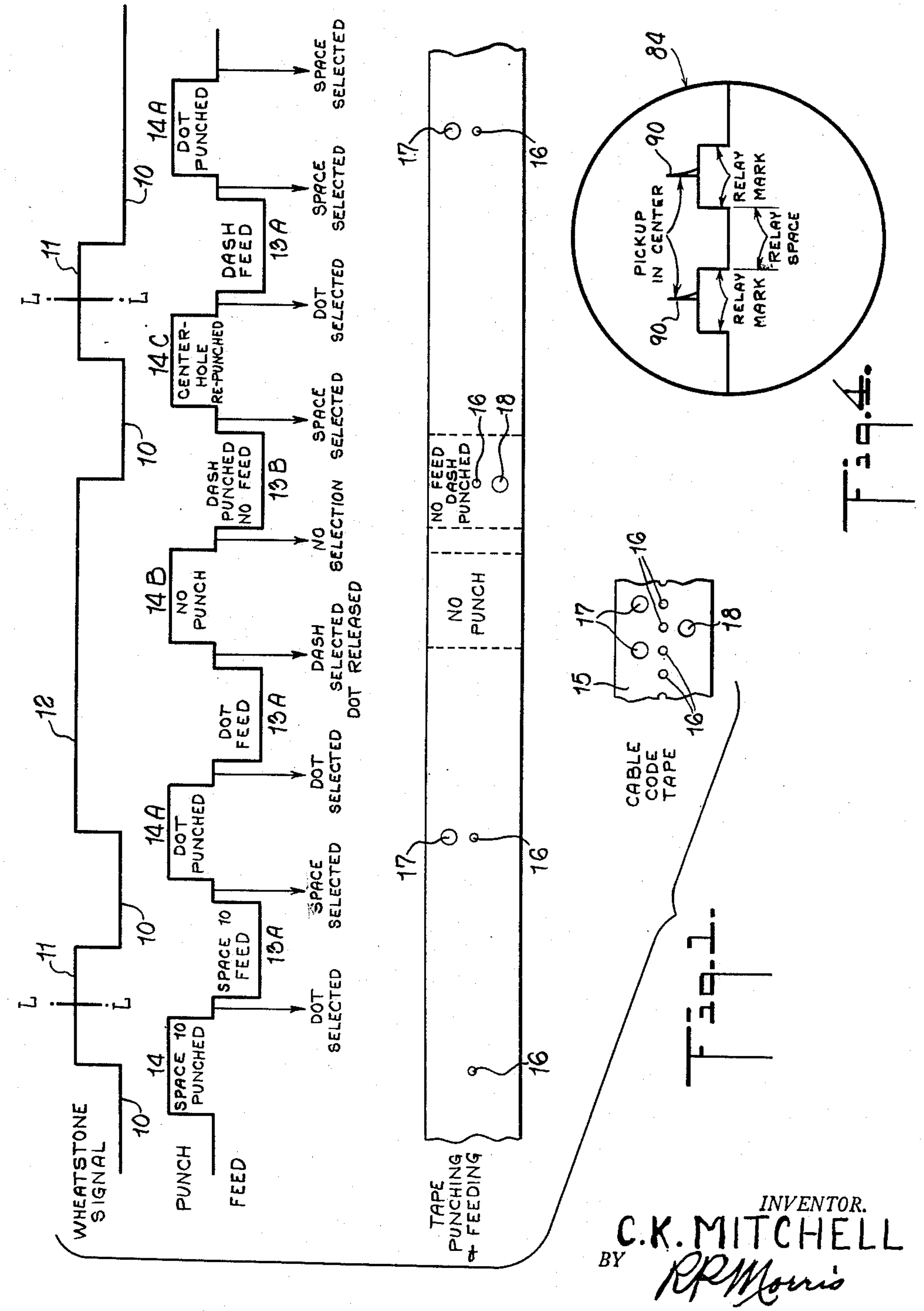

This invention relates to coded signal reception and to tape punching systems, and more especially it relates to such systems which receive signals as elements of one transmission code to control the perforation of a tape according to a different code.

The Wheatstone code is a two-element code employing the dot and dash system of signals in the standard international code, the dot and dash signal elements being represented by positive or marking current impulses and with the marking portion of the dash signals three times the duration of the corresponding portion of the dot signals. The intervals between dot and dash signals are indicated by negative or spacing current. Cable code is a three-element code, employing positive current impulses to represent dots, negative current impulses of equal duration to represent dashes, and periods of no current to represent spaces or intervals. The cable code is customarily recorded in paper tape by punching a series of center holes in the tape at uniform distances from each other, as well as an additional hole above the center hole to represent a dot signal, and an additional hole below the center hole to represent a dash signal. Where a center hole alone appears, that represents a space. A typical system for perforating a tape according to a cable code in response to received signals of a Wheatstone code is disclosed in U. S. Letters Patent No. 2,398,115, granted April 9, 1946. The present invention is in the nature of an improvement upon the mechanism disclosed in said U. S. Patent No. 2,398,115, and a principal object of this invention is to improve the reliability and accuracy of operation of the mechanism disclosed in said patent.

A feature of the invention relates to an arrangement for punching cable code elements in a tape under control of received Wheatstone code signals using a special pulse-timing arrangement for rendering the punching operation relatively independent of irregularities in the received Wheatstone code signals. This is particularly important where the signals are received via radio and wherein the normal length of dot or dash may be distorted during transmission.

Another feature relates to a system of the kind disclosed in said Patent No. 2,398,115 and employing a pair of polar relays which are controlled conjointly by a single receiving relay and by a pair of cyclically opened and closed circuits, such for example as tuning fork control circuits; and the said polar relays are also under control of a series of regularly recurrent sharp timing pulses which can be adjustably phased with respect to the center point of the normal dot and dash impulses being received.

Another feature relates to a system of Wheatstone-to-cable code signal transformation employing a single non-polarized receiving relay and a pair of polarized relays in conjunction with means to produce a series of regularly recurrent sharp timing pulses which act on said polarized relays to regenerate the received signals, thus preserving a fixed timing relation between the operation of the punch control magnets and the actual center portion of the received dot and dash signals.

Another feature relates to an automatic arrangement for punching cable code in a tape in response to received dot-dash signals, which signals may undesirably vary in standard dot or dash duration, said arrangement including signal storage elements such as condensers for delivering sharp timing pulses which are phased with the actual center portion of the received dots and dashes. As a result of this feature, the phase relationships of the operating currents applied to the selecting elements of the tape perforator are uniformly correct with respect to the operating currents applied to the punching and feeding elements of said tape perforator, notwithstanding that the phase and duration of the received dot-dash signals may vary from standard, as may happen for example, in the case of radio transmission, long lines transmission and the like.

Other features and advantages will be revealed after a consideration of the following detailed descriptions when taken in conjunction with the appended drawings.

Figure 2:
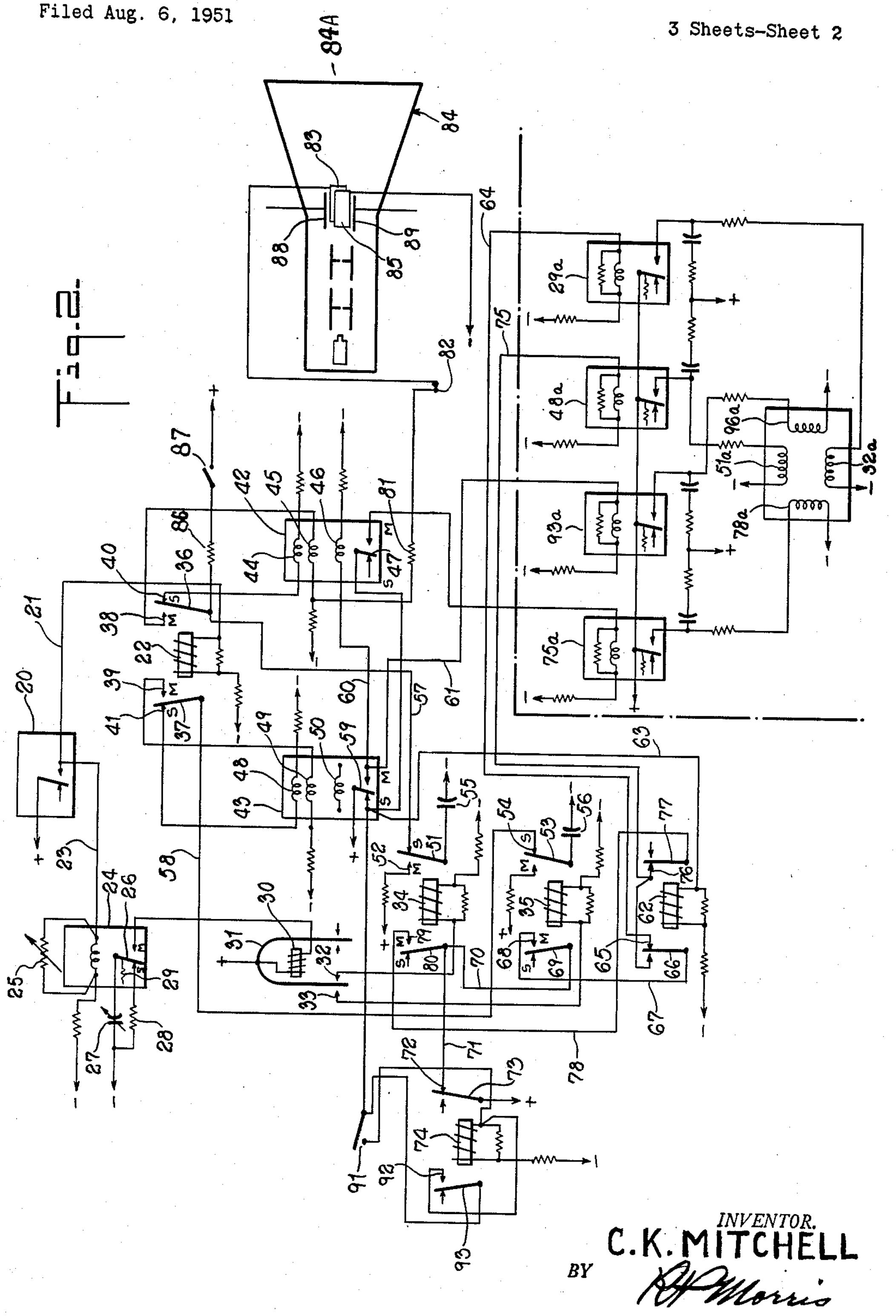
Figure 3:
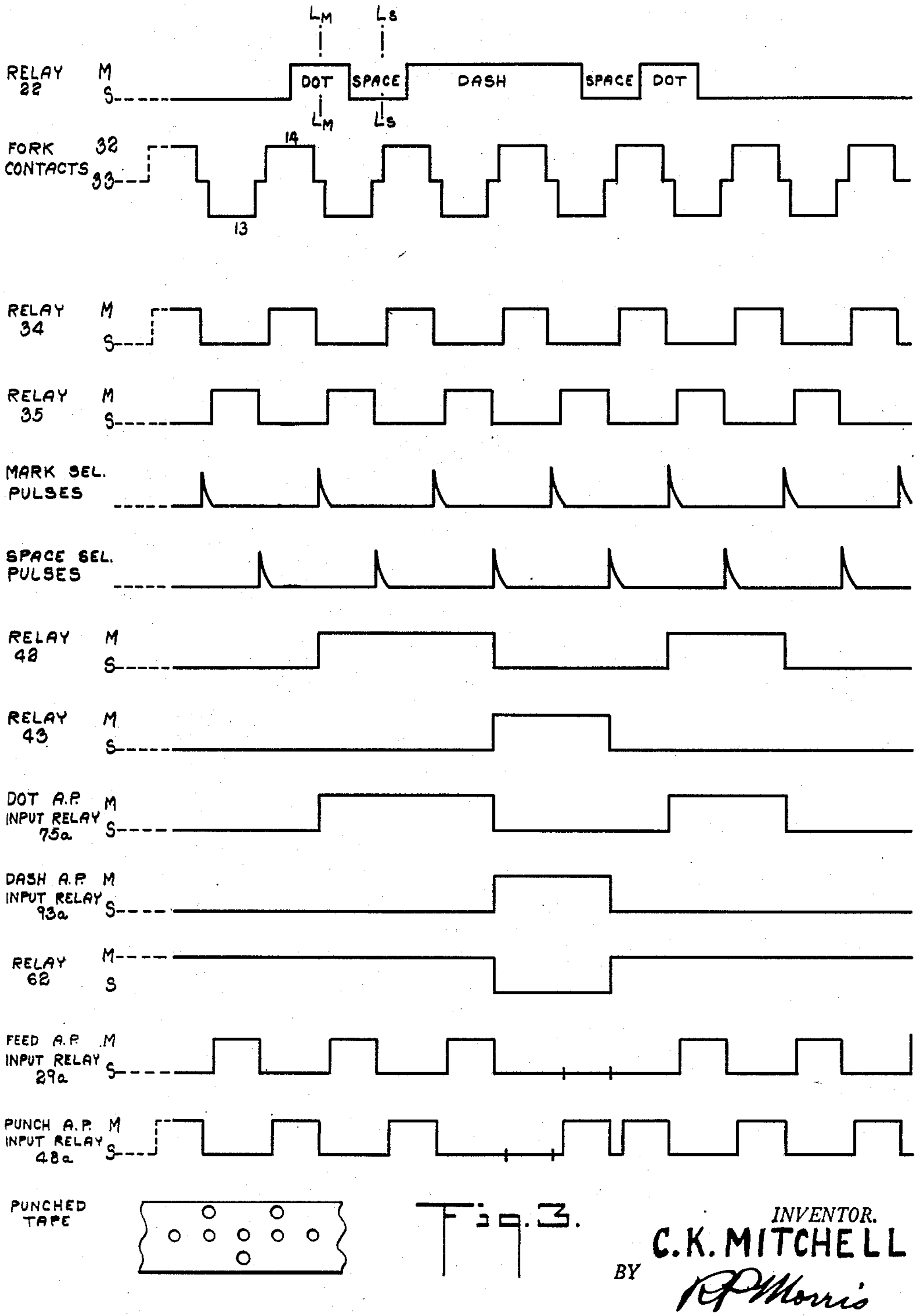

In the drawings which represent, by way of example, a preferred embodiment,

Fig. 1 is a composite diagram explanatory of the general relation between a particular received Wheatstone signal, for example that representing the letter "R," and the corresponding punched cable-code tape, Fig. 2 is a detailed schematic wiring diagram of the arrangement according to the invention, Fig. 3 is a series of graphs or wave diagrams showing the relation between the timing of the various operating elements of Fig. 1, Fig. 4 is a front view of the face of a cathode-ray tube oscilloscope showing the relation between the timing pulses and the operation of certain of the relays.

Referring to Fig. 1, the received Wheatstone code signal, for example representing the letter "R," consists of a series of "space" or negative impulses 10, dot or short positive marking impulses 11, and a dash or long positive marking impulse 12, the dash signal 12 being three times as long as a dot signal. It will be understood of course, that the signal representing the letter "R" is merely chosen for explanatory purposes and the same principles of operation apply to the transmission of any other letter, numeral or other character to be received. The system includes apparatus synchronized with the incoming signals to provide alternate tape feed, and tape punching contacts 13, 14, at the midpoint of each signal time unit, this time unit being equal to the reception period of a dot, and also equal to the period of a space element and to one-third of the marking portion of a dash. In punching the perforations in the tape 15, successive center holes 16 are punched when no signal either dot or dash is received. Each signal element for example dot 11 or dash 12, begins at the midpoint of punch contact 14. When such a signal is received, punch contact 14 upon closing, causes the mechanism to punch a center hole corresponding to the previous space and, upon its termination, to operate a dot selector. If the signal is a dot, it will terminate before the next punch contact 14*a* occurs and feed contact 13*a* will now operate to feed the tape forward one center hole. At the next closure of punch contact 14*a*, the mechanism will punch a dot hole 17 as well as the corresponding center hole 16. If, on the other hand, the signal is a dash, it will continue through the next punch contact 14*b*, and means are provided for eliminating the punch operation during the reception of the dash and for automatically shifting the dot selecting connection to a dash selection. Means are also provided which become operative during the next feed contact 13*b* to prevent tape feeding during the reception of the dash and contact 13*b* is utilized to punch the dash hole 18 as well as the corresponding center hole 16. In sending the letter "R" the space following the dash is selected just after contact 13*b* terminates and the next closure of contact 14*c* re-punches the center hole 16 corresponding to the dash hole 18. The dot following the dash is selected just after contact 14*c* terminates and the next closure of feed contact 13*a* feeds the tape forward one center hole. The space following the last dot is selected just after contact 13*a* terminates and the next closure of punch contact 14*a* causes the dot hole 17 as well as the corresponding center hole 16 to be punched simultaneously.

Referring to Fig. 2 of the drawing, the received dot and dash signals operate the non-polarized receiving relay 20, which when operated by a received signal element, connects positive battery through its armature over conductor 21, thence through the winding of relay 22 to negative battery. The above positive battery is also applied over conductor 23 to the winding of phasing control relay 24, and thence to negative battery. The winding of relay 24 is shunted by an adjustable resistor 25 and the armature 26 of this relay is connected to negative battery through an adjustable condenser 27, while the spacing contact S of this relay is connected to the negative battery through resistor 28. The armature 26 is normally biased to engage the space contact S by spring 29. The mark contact M of relay 24 is connected to positive battery through the winding 30 of the tuning fork 31. It will be understood that an electromagnetically driven tuning fork is shown merely by way of example and any other equivalent vibrating member or system may be employed. For example, this vibrating system may comprise an electron tube switch, a multi-vibrator, or even a continuously running distributor or commutator. Furthermore, instead of using the voltage from the contact of relay 24 to provide the operating power for the fork 31, this may have its own local drive element for operating the fork at a predetermined frequency, and the voltage from the contacts of relay 24 can be used merely to maintain the fork at the proper frequency and phases. For an illustration of a typical electron tube switch circuit that may be used in place of the fork 31, reference may be had to "Electronic Circuits and Tubes" (1947), McGraw-Hill Book Co., Inc., at page 788, Fig. 4.1. Likewise, for a disclosure of a tuning fork which has its own local source of driving power and which can be controlled as to frequency and phase by a synchronizing signal, reference may be had to "Radio Engineering Handbook" (Third edition), McGraw-Hill Book Co., Inc., at page 316, Fig. 32.

In the well-known manner, the tines of fork 31 are arranged to vibrate and one of these tines is provided with two contacts 32, 33, which are out of engagement with the corresponding fork tine except when the tine is vibrating. In other words, when the fork tine is moving in one direction, it momentarily closes a circuit with contact 32, then the reversal of the tine movement opens this contacting circuit and a short interval thereafter the fork tine engages contact 33. As will be described hereinbelow by means of adjustment of the resistor 25 and the condenser 27, the phase of engagement of the fork tine with the contact 32 and with the contact 33, can be adjusted without of course changing the actual frequency of vibration of the fork. It will be understood of course, that the fork has a natural frequency which is substantially the same as the "cadence" of the received signals and therefore the fork is synchronized with the operation of armature 26. The contact 32 is connected to the winding of a relay 34 and the contact 33 is connected to the winding of a relay 35. The fork tine is connected to positive battery so that when the tine contacts engage either contact 32 or contact 33, it extends this positive battery either through the winding of relay 34 to negative battery or through the winding of relay 35 to negative battery. Thus, the relays 34 and 35 are regularly and recurrently operated at the frequency of the fork and the phase of their operations is controlled by the phase of vibration of the fork tine. In accordance with one feature of the present invention, the phase of vibration of the fork and therefore the phase of recurrent alternate operation of relays 34, 35, are adjusted by means of the resistor 25 and condenser 27.

It is clear therefore, that the armatures 36, 37 of relay 22, move as a unit to engage their respective mark contacts 38, 39, or their respective space contacts 40, 41, and in timed relation with the operation of the contacts of relay 20.

Associated with relay 22 are two polar relays 42, 43. Relay 42 has a spacing control winding 44, a mark control winding 45, and an auxiliary winding 46. The right-hand end of winding 44 is connected to negative battery, while the left-hand end of winding 45 is connected to negative battery. When positive potential is applied to the left-hand end of winding 44, the armature 47 is operated to engage the space contact S. When a positive potential is applied to the right-hand end of winding 45, armature 47 is operated to engage its mark contact M. When a positive potential is applied to the left-hand end of winding 46, the armature 47 is moved to engage the space contact S. The windings 48, 49 and 50 of relay 43 correspond respectively to windings 44, 45 and 46 of relay 42 and function similarly.

From the foregoing, it will be seen that when the armature 51 of relay 34 is on its mark contact 52, the corresponding armature 53 of relay 35 is on its space contact 54. Each of the armatures 51, 53, is connected to negative battery through a respective storage condenser 55, 56. Thus when either armature 51 or 53 is on its mark contact, it connects positive battery to its respective storage condenser charging that condenser up to a predetermined potential. Consequently when the armature 51 or armature 53 moves to its spacing contact, it provides a discharge path from its respective condenser and over the respective conductor 57 or 58, to respective armature 36 or 37. If armatures 36, 37, are on their respective mark contacts 38, 39, then the respective one of the two condensers 55 or 56 discharges, and either winding 45 will be energized, or winding 49 will be energized to move the respective armature 47 or 59 to its marking position. The phase of closure of the fork contacts 32, 33, is adjusted by resistor 25 and condenser 27, so that the circuit through contact 32 is opened just ahead of the center line $L_m—L_m$ (Figs. 1 and 3) of the marking portion of a dot signal. Likewise, the circuit through contacts 33 is opened just ahead of the center line $L_s—L_s$ (Figs. 1 and 3) of the spacing portion of a dot signal.

Whenever either of the condensers 55 or 56 is connected by its respective armatures 51, 53, in a discharge circuit as above described, the discharge current flow is of very brief duration, this duration being approximately 25% of the normal duration of the marking portion or of the spacing portion of a dot signal. Thus, these discharges are in the nature of sharp pulses as shown in the graph of Fig. 3 designated "Mark Sel. pulses" and "Space Sel. pulses." From Fig. 3, it will be seen that these pulses occur at the centers of the dot marking and spacing signals. Consequently, the lengths of the received dot, dash and space signals may vary considerably from the original or normal uniform length without affecting the proper operation of the polar relays 42 and 43. If therefore, relay 22 is operated to mark condition, at the same instant that a discharge pulse occurs from condenser 55, relay 42 will operate its armature to the mark contact M. Likewise, if relay 22 is operated to space at the same instant a discharge pulse occurs from condenser 55, relay 42 will operate its armature to the space contact S. Furthermore, if relay 22 is operated to mark, when a discharge pulse is received from condenser 56, relay 43 will be operated to mark; and if this pulse occurs when relay 22 is at space, the relay 43 will also operate to space. It should be observed that when armature 59 engages its mark contact M, positive battery is extended over conductor 60 and through winding 46 to operate armature 47 to space.

From the foregoing, it will be seen that the operation of relays 42 and 43 is controlled at all times by relays 34 and 35, which in turn are controlled by the contacts 32 and 33 of the fork. Since the phase of closure of these contacts can be accurately adjusted with respect to the actual center line of the dot and space signal time units, the operation of relays 42 and 43 is relatively independent, within substantial limits, of the duration of the dot or dash signals.

The portion of Fig. 2 within the dot-dash line represents the tape punching and tape feeding controls of a standard tape perforator. They comprise a dot punch control magnet 78*a*, the dash punch control magnet 96*a*, the main punch operating magnet 51*a*, and the tape feed magnet 32*a*. These magnets are controlled by respective dot control relay 75*a*, dash control relay 93*a*, punch control relay 48*a*, and tape feed control relay 29*a*. For a detailed description of how the magnets 75*a*, 93*a*, 48*a* and 29*a* operate to punch and feed the tape, reference may be had to Fig. 2 of said U. S. Letters Patent No. 2,398,115 and its accompanying description. It should be observed that the tape punch control and tape feeding relays and their respective magnets are designated alike in Fig. 2 of the present application, and Fig. 2 of the said Letters Patent with the exception that the designations of these elements carry the suffix "*a*" in the present application.

Referring to Fig. 2, it will be seen that the dot control relay 75*a* is energized to mark, only when the armature of relay 42 is at mark and providing the armature of relay 43 is at space. Thus, this determines the punching of a dot perforation in the tape. Also the armature 59 of relay 43 remains on its space contact during the reception of both dots and space units as represented by the graph labelled "relay 54" in Fig. 3. On the other hand, when a Wheatstone dash signal is received, relay 43 operates its armature 59 to the mark contact M. When thus operated, the following functions are performed. Positive battery is removed from the armature 47 to prevent the operation of dot control relay 75*a*, and this armature 47 is moved to its space contact under control of winding 46. At the same time, positive battery is extended over conductor 61 to operate the dash punch control relay 93*a*.

The tape perforating control relay 29*a* is under control of another relay 62. Relay 62 receives operating current over conductor 63 as long as armature 59 is on its space contact, that is as long as a dot mark signal or a dot space signal is being received. As long as relay 62 is thus operated the winding of tape feed control relay 29*a* is in condition to receive operating impulses over conductor 64, contact 65, armature 66, conductor 67, contact 68, armature 69, conductor 70, conductor 71, contact 72, and armature 73 of relay 74. Thus, the tape is fed one unit for each dot signal that is received. It should also be observed that the punch control relay 48*a* is energized over conductor 75, contact 76, armature 77, conductor 78, contact 79, armature 80, conductor 71, contact 72 and armature 73.

However, when a dash signal is received, armature 59 moves to its mark contact and breaks the above-described operating circuit for relay 62 which thereupon releases. This shifts the punching operation for dashes from the contact 79 of relay 34 to contact 68 of relay 35 and eliminates one tape feed operation per dash signal. The net result is that the reception of a Wheatstone dash signal has the effect of causing the tape to be fed the distance of only one center hole notwithstanding that the Wheatstone dash is two center holes in length.

Fig. 3 is a graph of the pulse timing and relay sequence which is effective during the reception of a typical Wheatstone-code signal, for example the letter "R." It is believed therefore, that the sequence of operations between the reception of the Wheatstone-dot-dash signals and the final perforation of the tape with cable code perforations will be clear from the showing of Fig. 3, taken in conjunction with the above-described operation of Fig. 2.

In order that the proper phasing may be obtained between the center lines of the dot mark and dot space signals (see Fig. 3), the left-hand terminal of winding 45 of relay 42 is connected through a suitable high resistance 81 to a corresponding switch or socket contact 82 which can be connected to one of the deflecting elements, for example one of the vertical deflecting plates 83 of a cathode-ray tube oscilloscope 84. The other vertical deflecting plate 85 is permanently connected to negative battery. Thus by connecting the vertical deflecting plate 83 to socket 82, the pulses supplied from the condenser 55 which are also impressed upon winding 45, are superimposed upon the traces appearing upon the cathode ray screen 84A of the oscilloscope 84, which traces represent the duration of energization of winding 45 by the relay 22. It will be understood, of course, that the remaining deflection plates or elements 88, 89 of the cathode ray tube oscilloscope are connected to a suitable time-base potential source in a manner well understood by those skilled in the art. In order to produce a square wave display upon cathode ray screen 84A corresponding to the marking and spacing positions of the armature 36 of relay 22 in response to received signals a positive potential is applied through manually operated switch 87 and via high resistance 86 to the armature 36. The switch 87 is closed only when adjusting the variable resistor 25 and the variable condenser 27. The value of resistance 86 is such as to produce a square wave display upon screen 84A having an amplitude relative to the amplitude of the pips 90 as shown on Fig. 4. It is possible therefore, by adjusting variable resistor 25 and the condenser 27, to center the pips 90 (Fig. 4) with the center line of the traces representing the marking energization periods of the winding 45.

Instead of supplying the positive battery to conductor 71 through the contact of relay 74, this positive battery may be permanently connected to that conductor. The purpose of relay 74 in conjunction with its associated operating button 91, is to provide means of stopping the automatic perforator when dot signals only are being received. Normally, the relay 74 is deenergized but when dot signals are being continuously received, the armature 59 continuously applies positive battery to one contact of button 91, so that the operation of that button completes an energizing circuit for relay 74. This relay when operated locks up through its contact 92 and armature 93 independently of button 91. However, when a dash signal is received, this locking circuit is broken and relay 74 returns to normal to perform its functions as above-described.

While I have described above the principles of my invention in connection with specific apparatus, it is to be clearly understood that this description is made only by way of example and not as a limitation to the scope of my invention.

What is claimed is:

1. Automatic telegraph apparatus of the kind described, comprising in combination means to receive dot and dash telegraph code signals, means to derive from said signals other signals, a tape to be perforated with at least two rows of perforations one representing dot signals and the other representing dash signals, dot punch-control means, dash punch-control means, signal regenerating means controlled by the received dot and dash signals, said signal regenerating means including means to derive regularly recurrent timing pulses whose phase is adjustable with respect to the center lines of the received dot signals, and circuit connections for applying the regenerated signals and the timing pulses to insure that said punch-control means receive uniform operating impulses regardless of duration-distortion in the said received signals.

2. Automatic telegraph apparatus according to claim 1 in which additional punch-control means are provided for perforating said tape with equidistant feed holes displaced laterally with respect to both the dot and dash holes, means synchronized with the received dot signals for controlling said additional punch-control means, and means for automatically step-feeding said tape a uniform distance regardless of whether the received signal is a dot or a dash.

3. Automatic telegraph apparatus of the kind described, comprising in combination, means to receive dot and dash telegraph code signals, means to derive other signals from said dot and dash signals, a tape to be perforated with at least two rows of perforations one representing dot signals and the other representing dash signals, dot perforation-punching control means, dash perforation-punching control means, signal regenerating means for the received dot and dash signals and including means to derive regularly recurrent timing pulses; and means to adjust the phase of said timing pulses with respect to the center lines of the received dot signals, the last-mentioned means including a constantly operating synchronizing device having a pair of circuits to be alternately and recurrently opened and closed, a relay operated in response to the received dot and dash signals said relay having adjustable means for controlling the phase of said opening and closing of said pair of circuits.

4. Automatic telegraph apparatus according to claim 3 in which said constantly operating synchronizing device comprises a mechanically resonant member such as a tuning fork.

5. Automatic telegraph apparatus according to claim 3 in which said relay has an energizing winding to which the received dot and dash signals are applied, said winding having adjustable means to phase the operation of the relay with respect to the center line of the received dot signals, said relay having an armature and two contacts between which it is movable, a voltage integrating circuit including a voltage storage element connected to said armature for storing a voltage when said armature engages one of said contacts and for discharging said voltage when said armature engages the other of said contacts, and circuit connections for applying said stored voltage to said synchronizing device to control the phasing thereof.

6. Automatic telegraph apparatus for translating received dot and dash telegraph signals into cable code perforations in a tape, comprising in combination, a non-polar relay which is operated by the received dot and dash signals, a phasing relay which is also operated by the received dot and dash signals, a pair of polar relays, dot perforation-punching control means and dash perforation-punching control means controlled respectively by said polar relays, a pair of timing relays each having a two-position armature, a constantly operating synchronizing device for alternately and recurrently operating said timing relays, a voltage storage element for each of said timing relays each storage element being connected to receive a charge when the armature of the associated timing relay is in one position and to release said charge when said armature is in the other position, circuit connections including said storage elements for causing said polar relays to be selectively operated to mark or space under conjoint control of said non-polar relay and said timing relays, and means to adjust the phase of operation of said timing relays with respect to the center lines of received dot signals for the purpose set forth.

7. Automatic telegraph apparatus according to claim 6 in which visual indicating means is connected to the winding of one of said polar relays for producing a characteristic indication when said timing pulses are phased with the said center lines.

8. Automatic telegraph apparatus according to claim 6 in which means are provided for step-feeding the tape, circuit connections controlled by said timing relays for feeding said tape in synchronism with the mark and space portions of received dot signals, and other circuit connections effective when a dash signal is received to suppress said tape feeding when a dash perforation is to be punched and for automatically resuming said tape feed when said dash perforation has been punched.

References Cited in the file of this patent

UNITED STATES PATENTS

| Number | Name | Date |
|---|---|---|
| 1,629,466 | Angel | May 24, 1927 |
| 2,398,115 | Rosenberger | Apr. 9, 1946 |
| 2,492,503 | Spencer et al. | Dec. 27, 1949 |